(Model.)
S. GREGORY.
Mode of Attaching Tomb Stones to Bases, &c.
No. 230,546. Patented July 27, 1880.
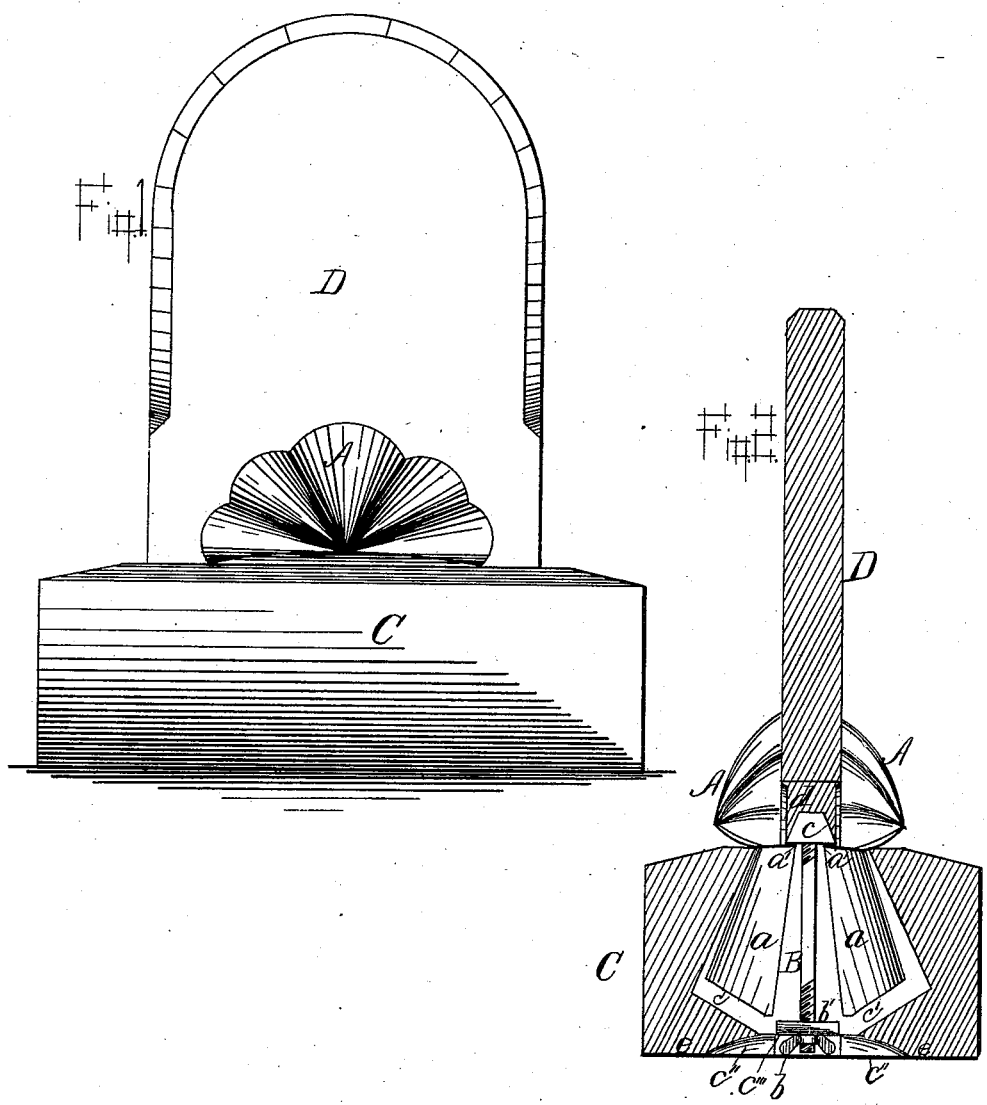

the parts over which it projects.

UNITED STATES PATENT OFFICE.

STEPHEN GREGORY, OF JONESVILLE, MICHIGAN.

MODE OF ATTACHING TOMB-STONES TO BASES, &c.

SPECIFICATION forming part of Letters Patent No. 230,546, dated July 27, 1880.

Application filed April 3, 1880. (Model.)

*To all whom it may concern:*

Be it known that I, STEPHEN GREGORY, of Jonesville, in the county of Hillsdale and State of Michigan, have invented a new, useful, and Improved Method and Device for Attaching Tomb-Stones to their Base or Bases, and for attaching columns, urns, and posts of any material to whatever they are set upon; and I do hereby declare that the following is a full, clear, and exact description thereof, reference being had to the accompanying drawings, and to the letters of reference marked thereon, making a part of this specification.

My invention relates to an improvement in tomb-stones and clamps for securing tomb-stones, urns, vases, and other similar devices to their pedestals; and it consists in the clamps or jaws A A, having vertical projections $a\ a$ and shoulders $a'\ a'$, the fastening-rod B, having nut $b$ and washer $b'$ and metallic cap or block $c$, pedestal C, having vertical recess $c'$ and recess $c''$, the tomb-stone D, with recess $d$, and in the construction, combination, and arrangement of the parts, as hereinafter more specifically set forth.

In the drawings, Figure 1 is a front view of my tomb-stone. Fig. 2 is a transverse sectional elevation thereof.

C represents the pedestal of a tomb-stone having the vertical aperture $c'$, which flares or enlarges laterally from top to within a short distance of the bottom, where it terminates in the base $e$. It is provided with the recess $c'''$, for reception of the transverse plate $b'$, and also with the circular recess $c''$, to admit rotation of winged nut $b$.

A A mark metallic clamps, which may, from the upper plane of the pedestal upward, be constructed and fashioned as shown, or in any ornamental design. They have rigidly attached thereto the vertical projections $a\ a$, provided with the shoulders $a'\ a'$. These vertical projections may be cast solid with the shells A A, or separately, and be bolted thereto. From where united to the shells they are slightly enlarged toward the bottom, at right angles to the shells, and are beveled at bottom thereof, to conform to the contour of the pedestal-rest.

The tomb-stone D is provided with the recess $d$, whose edges at bottom are beveled as a means of closely fitting the parts over which it projects.

B is the fastening-rod, provided with a metallic cap or block, $c$, at top thereof; but I do not limit myself to the shape or form of said cap, as a disk may be employed.

In the operation of securing the parts together the stone or other device it is designed to erect is inserted between the clamps or jaws A A, which latter are placed in position, as shown in Fig. 1, and the rod is then tightened by the nut $b$, which presses against the plate $b'$, and causes the projecting pieces $a\ a$ to be spread apart and the clamps to tightly embrace the tomb-stone or other article and hold it rigidly in position. Then cement, brimstone, or any suitable composition is poured into the base and between the clamp, which thoroughly fills the slot around the legs of the clamp and the recess between the clamp and the tomb-stone, and thus renders the structure rigid and complete.

In practice it may be found desirable to employ an inside lining in the recess $c'$ on the base $e$, which, being but a mechanical expedient, is deemed unnecessary to further specify.

What I claim is—

1. The clamps or jaws A A, having shoulders $a'\ a'$ and vertical projections $a\ a$, operating in recess $c'$ of pedestal C by means of rod B, with cap $c$, nut $b$, and plate $b'$, for attaching and securing tomb-stones, urns, columns, &c., to pedestals, substantially as shown and described.

2. The combination of clamps A A, having shoulders $a'$, threaded rod B, with nut $b$, recessed pedestal C, and plate $b'$, substantially as shown, and for the purpose described.

3. The pedestal C, with recesses $c'$ and $c'''$, rod B, threaded for nut $b$, and having cap $c$ and plate $b'$, and clamps A A, with shoulders $a'\ a'$, substantially as shown and described.

4. The clamps A A, having vertical projections $a\ a$, with shoulders $a'\ a'$, threaded rod B, plate $b'$, and pedestal C, substantially as shown, and for the purpose described.

STEPHEN GREGORY.

Witnesses:
SETH D. McNEAL,
JONATHAN B. GRAHAM.